(12) United States Patent
Perkins et al.

(10) Patent No.: US 8,818,905 B2
(45) Date of Patent: Aug. 26, 2014

(54) SYSTEM AND METHOD FOR ENCRYPTING INTERACTIVE VOICE RESPONSE APPLICATION INFORMATION

(75) Inventors: George S. Perkins, Columbus, GA (US); Richard E. Sway, Columbus, GA (US)

(73) Assignee: Total System Services, Inc., Columbus, GA (US)

( * ) Notice: Subject to any disclaimer, the term of this patent is extended or adjusted under 35 U.S.C. 154(b) by 1999 days.

(21) Appl. No.: 11/821,693

(22) Filed: Jun. 25, 2007

(65) Prior Publication Data

US 2008/0317220 A1    Dec. 25, 2008

(51) Int. Cl.
*G06Q 20/00* (2012.01)
*H04M 3/493* (2006.01)
*G06F 21/31* (2013.01)
*G06Q 20/40* (2012.01)

(52) U.S. Cl.
CPC ........ *H04M 3/493* (2013.01); *H04M 2203/105* (2013.01); *G06F 21/31* (2013.01); *G06F 2221/2115* (2013.01); *H04M 2203/609* (2013.01); *G06Q 20/4012* (2013.01)
USPC ..................... 705/64; 705/72; 726/5; 726/21

(58) Field of Classification Search
USPC .......................................................... 705/64
See application file for complete search history.

(56) References Cited

U.S. PATENT DOCUMENTS

| | | | |
|---|---|---|---|
| 2002/0152180 A1* | 10/2002 | Turgeon | 705/72 |
| 2006/0064372 A1* | 3/2006 | Gupta | 705/39 |
| 2011/0081886 A1* | 4/2011 | Sheymov et al. | 455/410 |
| 2011/0197266 A1* | 8/2011 | Chu et al. | 726/5 |
| 2012/0054104 A1* | 3/2012 | Templeton et al. | 705/44 |
| 2013/0080232 A1* | 3/2013 | Fisher | 705/14.23 |
| 2013/0103587 A1* | 4/2013 | Labaton | 705/44 |
| 2014/0136420 A1* | 5/2014 | Hogg et al. | 705/71 |

* cited by examiner

*Primary Examiner* — Jamie Kucab
(74) *Attorney, Agent, or Firm* — King & Spalding

(57) ABSTRACT

Encrypting sensitive information sent using an interactive voice response (IVR) system. The systems and methods may include an HSM that provides a secure platform to encrypt the sensitive information. They may also include interfaces with IVR systems and transaction processing hosts. The systems and methods may interact directly with a customer using an IVR to receive the sensitive information. They may also provide for a secure platform to validate the strength of the information, such as a PIN or password, prior to further processing of the sensitive information.

14 Claims, 6 Drawing Sheets

SYSTEM AND METHOD FOR ENCRYPTING INTERACTIVE VOICE RESPONSE APPLICATION INFORMATION

FIELD OF THE INVENTION

This invention relates to systems and methods for encrypting voice response application information. More particularly, this invention relates to processes and systems that allow for the secure encryption and transmission of information entered using an interactive voice response application to a platform that supports transactions using the information.

BACKGROUND OF THE INVENTION

With the explosion of electronic commerce and digital personal information, facilitated by the rapid growth of the Internet, focus has been placed on the protection of financial and personal data. One element in protecting these data is encryption. Encryption is the process of converting information into an unintelligible form except to holders of a specific cryptographic key. By encrypting the information, it is protected against unauthorized disclosure.

Encryption is accomplished through a cryptographic algorithm. The algorithm is used to "lock" the information at one point and "unlock" it at another. Keys are used to lock and unlock the information. In a secret-key or symmetric key encryption, the same key is used to lock and unlock (encrypt and decrypt) the information. In public key or asymmetric key encryption, a public key is used to encrypt the information and a private key is used to decrypt the information. A key is often a numerical value. The length of the key generally determines the relative security of the key.

Many types of information use encryption. One example is the payment card industry, including credit card data and other financial information. Indeed, the credit card industry had taken great steps to ensure that financial data and transaction data is protected. For example, cardholder data must be encrypted when it is stored or transmitted over a public network. This requirement covers everything from producing the credit cards, including information stored on the magnetic strip or embedded chip on the card, to authenticating and authorizing transactions made with the card. One key piece of data that must be encrypted is a user's personal identification number (PIN).

Financial institutions employ interactive voice response (IVR) applications to support customer transactions. Typically, a customer will call a telephone number for the system. An automated system will provide recorded instructions to the user, such as, "for inquiries about a checking account, press 1." The customer uses the number key pad on a telephone to select menu items and enter alphanumeric data, such as an account number.

However, one option that is not available using an IVR application is for the customer to activate an account or card by supplying a PIN or password or to change a PIN, password, or other sensitive information, while providing a secure platform for the information. Current standards and best practices require this information to be encrypted and stored on a host system that supports account management or transaction authorization. PINs, passwords, and other similar information must be encrypted to protect the integrity of the PIN and, as a result, the underlying financial information. Current IVR applications cannot encrypt this data.

What is needed are systems and methods that provide for encrypting sensitive information used in financial or other transactions conducted using an IVR application.

SUMMARY OF THE INVENTION

The present invention supports encrypting sensitive information sent using an interactive voice response (IVR) application. One aspect of the present invention provides a system for encrypting information from an interactive voice response application. The system includes an interactive voice response application, operable to receive a data item from a telephone such as one or more selected numbers from a keypad associated with the telephone; an encryption voice response unit, logically connected to the interactive voice response application, and operable to encrypt the data item received from the telephone; and a host platform, logically connected to the encryption voice response unit and operable to receive the encrypted data item.

Another aspect of the present invention provides a method for encrypting a sensitive data item using an interactive voice response application. The method includes the steps of: (a) receiving the sensitive data item from a telephone comprising one or more selected numbers from a keypad associated with the telephone; (b) storing the sensitive data item on a secure platform; (c) encrypting the sensitive data item; and (d) transmitting the encrypted sensitive data item to a host platform.

Yet another aspect of the present invention provides a system for encrypting information from an interactive voice response application. The system includes an interactive voice response application, operable to receive a data item from a telephone such as one or more selected numbers from a keypad associated with the telephone; an encryption voice response unit including a hardware security module, logically connected to the interactive voice response, and operable to encrypt the data item received from the telephone; and a host platform, logically connected to the encryption voice response unit and operable to receive the encrypted data item and including a platform for authorizing financial transactions.

DETAILED DESCRIPTION OF THE EXEMPLARY EMBODIMENTS

Exemplary embodiments of the present invention are provided. These embodiments include systems and methods that encrypt sensitive information sent using an interactive voice response (IVR) application. The systems and methods may include a hardware security module (HSM) that provides a secure platform to encrypt the sensitive information. They may also include interfaces with IVR systems and transaction processing hosts. The systems and methods may interact directly with a customer using an IVR to receive the sensitive information. They may also provide for a secure platform to validate the strength of the information, such as a PIN or password, prior to further processing of the sensitive information.

Figure 1:
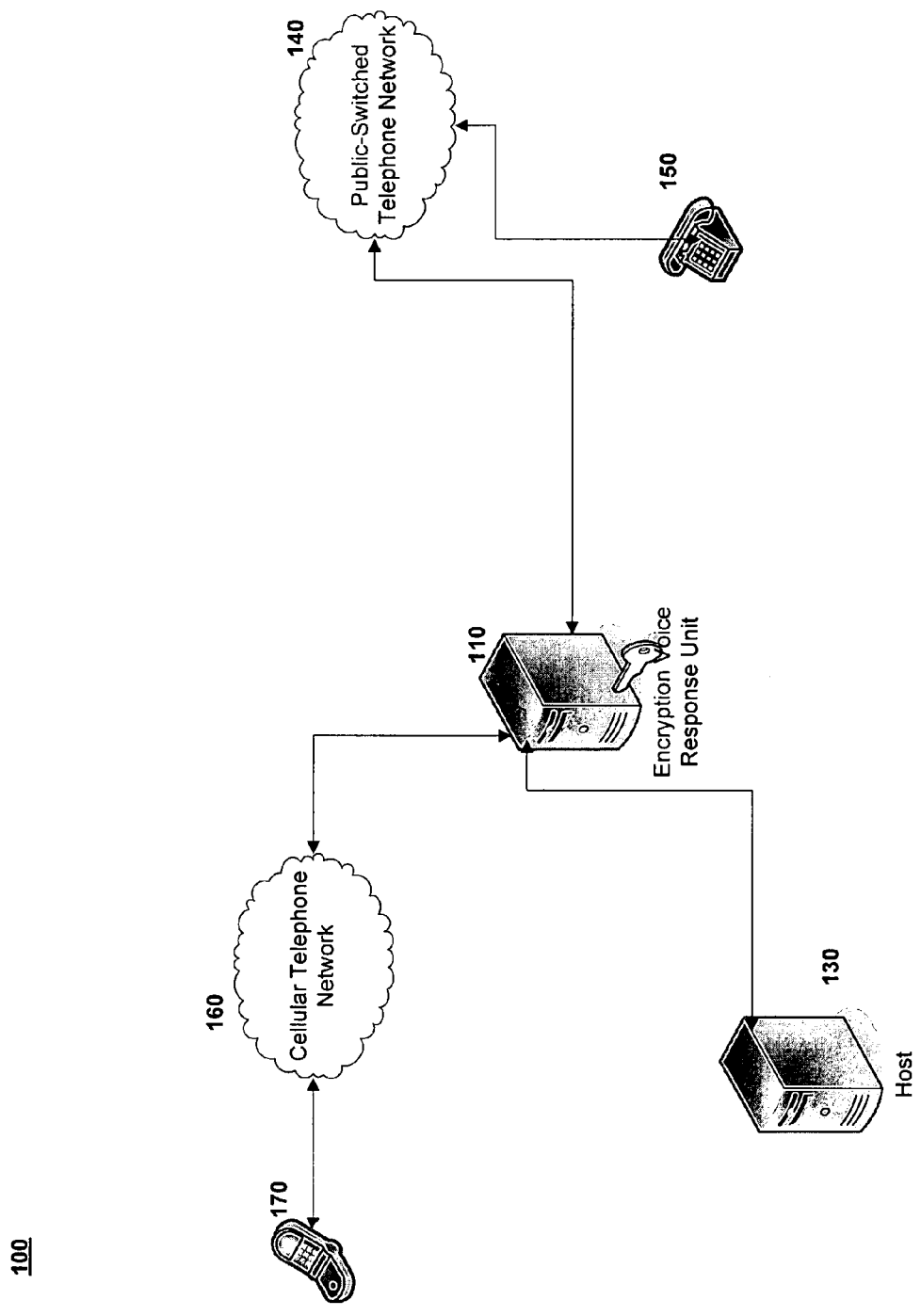
FIG. 1 depicts an operating environment in accordance with an exemplary embodiment of the present invention.

FIG. 1 depicts an operating environment 100 in accordance with an exemplary embodiment of the present invention. Referring to FIG. 1, an encryption voice response (EVR) unit 110 is shown. The exemplary EVR unit 110 connects with a host 130. The EVR unit 110 provides access between a customer and a financial account, such as a bank account or credit card account. The EVR unit 110 includes an IVR application (not shown), which typically provides automated service to a customer who accesses the IVR application through a telephone system. In this exemplary embodiment, a customer can access the EVR unit 110 through a public-switched telephone network (PSTN) 140 and touch-tone telephone 150 or through a cellular telephone network 160 and cellular phone 170. The touch-tone telephone 150 and cellular phone 170 would typically not have an encryption capability.

The EVR unit 110 augments functions of a traditional IVR application when information needs to be encrypted, such as when a customer provides a PIN or password, for example when activating an account or changing an existing PIN or password. The exemplary EVR unit 110 includes the IVR application. Alternatively, the EVR unit 110 may be connected to an IVR application over a wide-area distributed computer network, such as the Internet; or a direct connection, such as a dedicated line. As such, the EVR unit 110 may be a stand-alone kiosk or may reside on one or more secure networks.

The host 130 supports financial transactions involving an account for a customer. For example, the host 130 may authorize transaction for an account, such as a debit card account. Part of this process may be to verify a PIN supplied by the customer in connection with a transaction. Exemplary accounts would include a debit card linked to a specific bank account or a pre-paid debit card, such as a VISA or AMERICAN EXPRESS gift card. These cards may have a specific PIN or other security feature.

Figure 2:
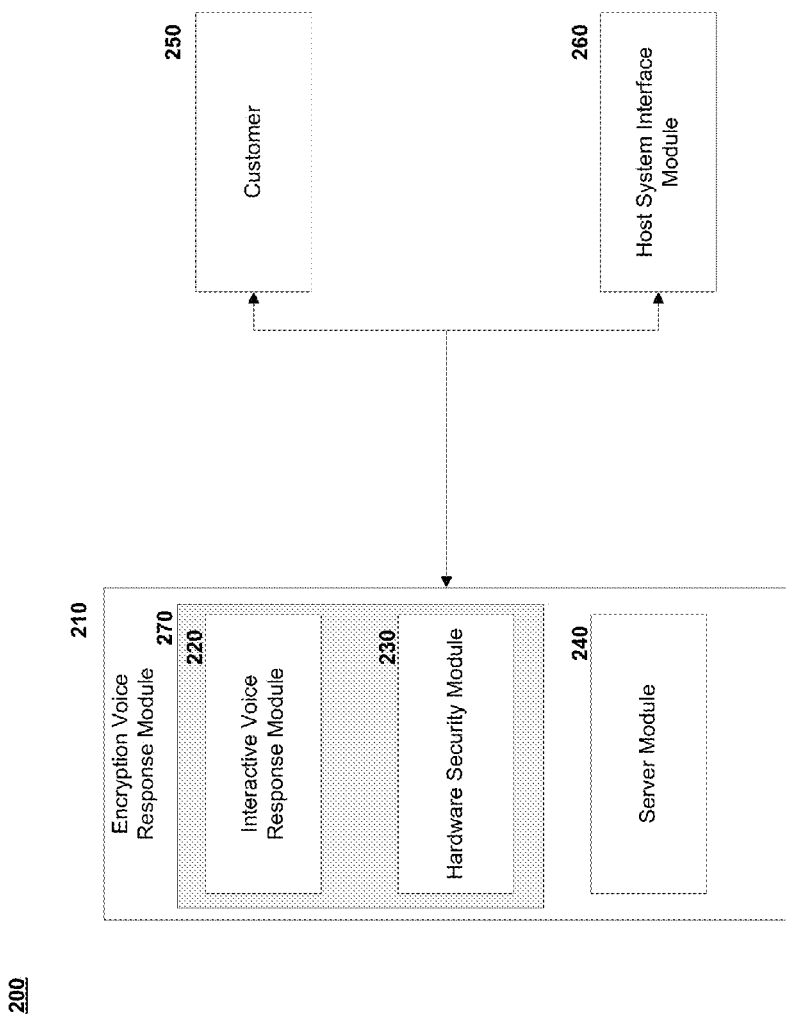
FIG. 2 depicts a system architecture in accordance with an exemplary embodiment of the present invention.

FIG. 2 depicts a system architecture 200 in accordance with an exemplary embodiment of the present invention. Referring to FIGS. 1 and 2, an EVR module 210 would reside on the EVR unit 110. The exemplary EVR module 210 includes an IVR module 220, a hardware security module 230, and a server module 240. The EVR module 210 would be operable to receive information from and transmit information to a customer 250 and a host system interface module 260.

The IVR module 220 component of the EVR module 210 would interface with the customer 250. For example, a customer calls EVR unit 110 to activate a debit card, such as a pre-paid card. The IVR module 220 would prompt the customer 250 for information. Information may include a card or account number. One step in this process may be to establish a PIN. At this step, the hardware security module 230 would be employed.

The hardware security module 230 is a combination of hardware and software, but may be embodied in software alone. The hardware security module 230 provides a secure platform to generate, store, and protect cryptographic keys.

The hardware security module 230 component of the EVR module 210 provides a secure platform to encrypt customer information, such as a PIN.

The server module 240 provides the operating environment to run the EVR module 210 and resides on the EVR unit 110. The server module 240 may simply be a known operating system, such as MICROSOFT WINDOWS.

One of ordinary skill in the art would appreciate that, with a distributed system, the customer 250 may contact a financial institution's IVR application (not shown). This application may not have a secure component. In that case, the IVR application would contact the EVR unit 110 to conduct secure tasks, such as encrypting a PIN.

Figure 3:
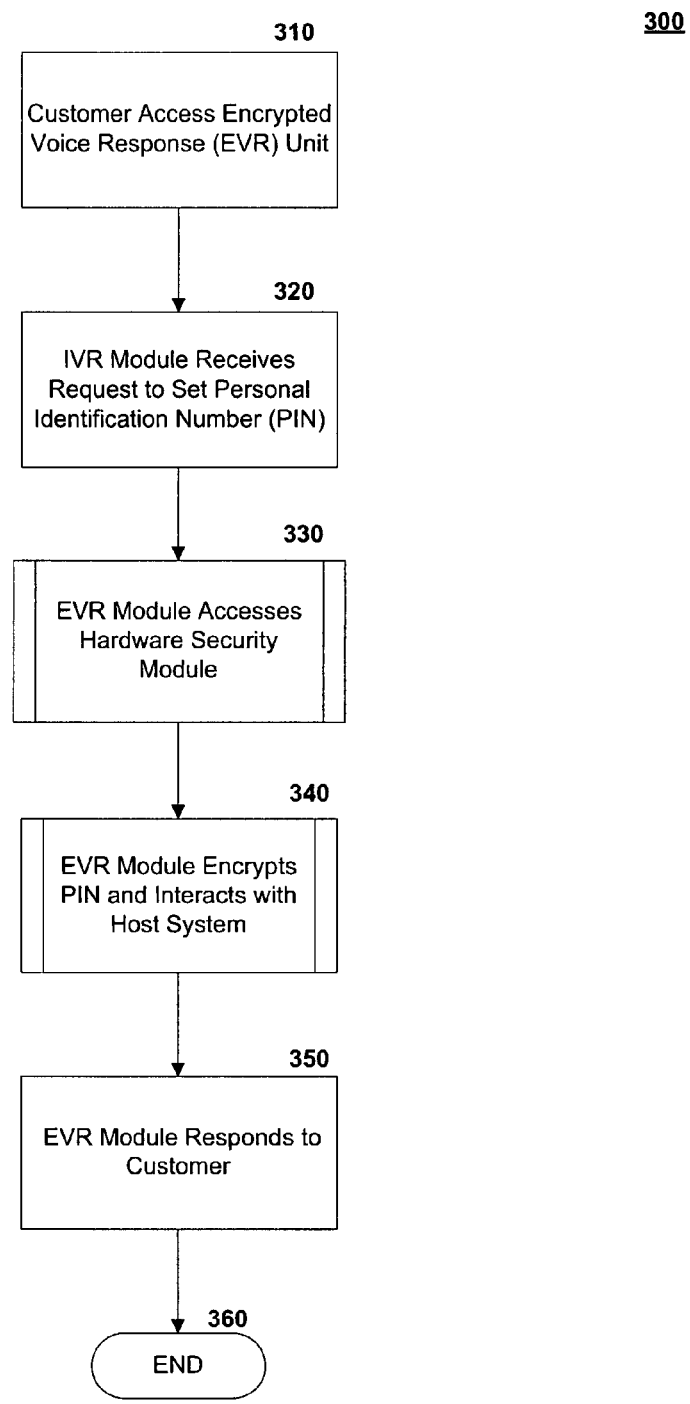
FIG. 3 depicts a process flow diagram for secure transmission of customer information gathered with an encryption voice response (EVR) application in accordance with an exemplary embodiment of the present invention.

FIG. 3 depicts a process flow diagram 300 for secure transmission of customer information gathered with an IVR application in accordance with an exemplary embodiment of the present invention. Referring to FIGS. 1, 2, and 3, at step 310, a EVR unit 110, using a telephone, such as telephone 140.

At step 320, the EVR unit 110, through the IVR module 220, receives a request to receive sensitive information, such as a PIN. At step 330, the EVR module 210 accesses the hardware security module 230. This step is described in greater detail below, in connection with FIG. 4. At step 340, the EVR module 210 encrypts the PIN, or other sensitive information, and interacts with the host 130. This step is also described below, in connection with FIG. 5.

At step 350, the EVR module 210 responds to the customer 250 to complete the customer service action. At step 360, the process ends. Of course, the IVR module 220 may continue to interact with the customer as necessary to complete the costumer's service.

Figure 4:
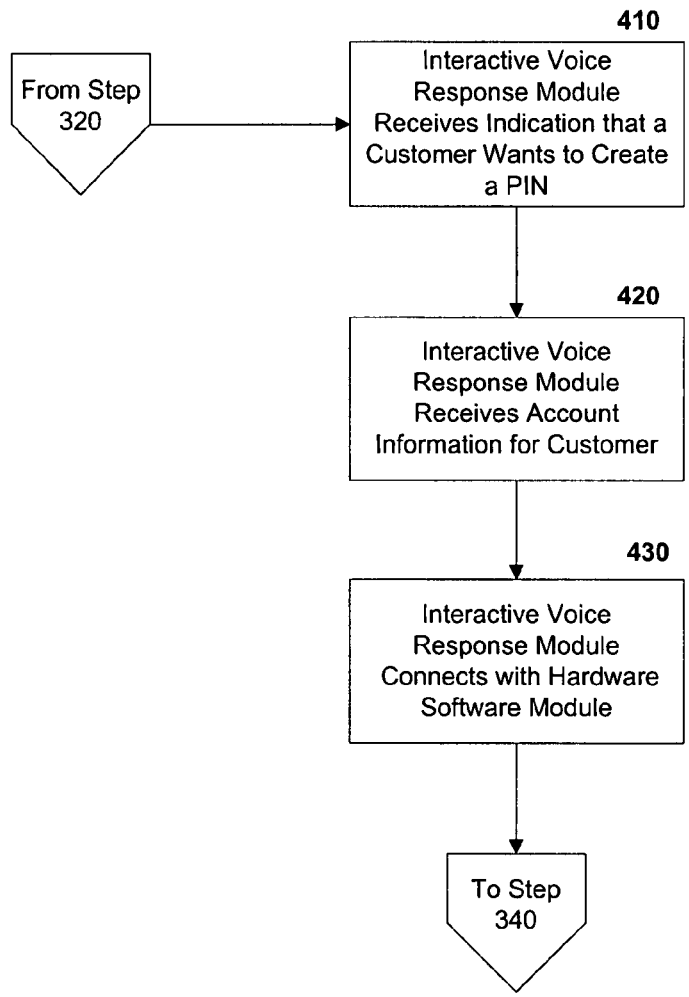
FIG. 4 depicts a process flow diagram for communicating customer information gathered with an EVR unit in accordance with an exemplary embodiment of the present invention.

FIG. 4 depicts a process flow diagram 330 for communicating customer information gathered with an EVR unit in accordance with an exemplary embodiment of the present invention. Referring to FIGS. 1, 2, and 4, at step 410, the IVR module 220 receives an indication that a customer using the IVR system needs to communicate sensitive information, such as a PIN. At step 420, the IVR module 220 receives information regarding the interaction with the customer. This information may include account information. At step 430, the IVR module 220 connects with the hardware security module 230. In alternative embodiments, the IVR module 220 may need to contact a remote hardware security module 230.

Figure 5:
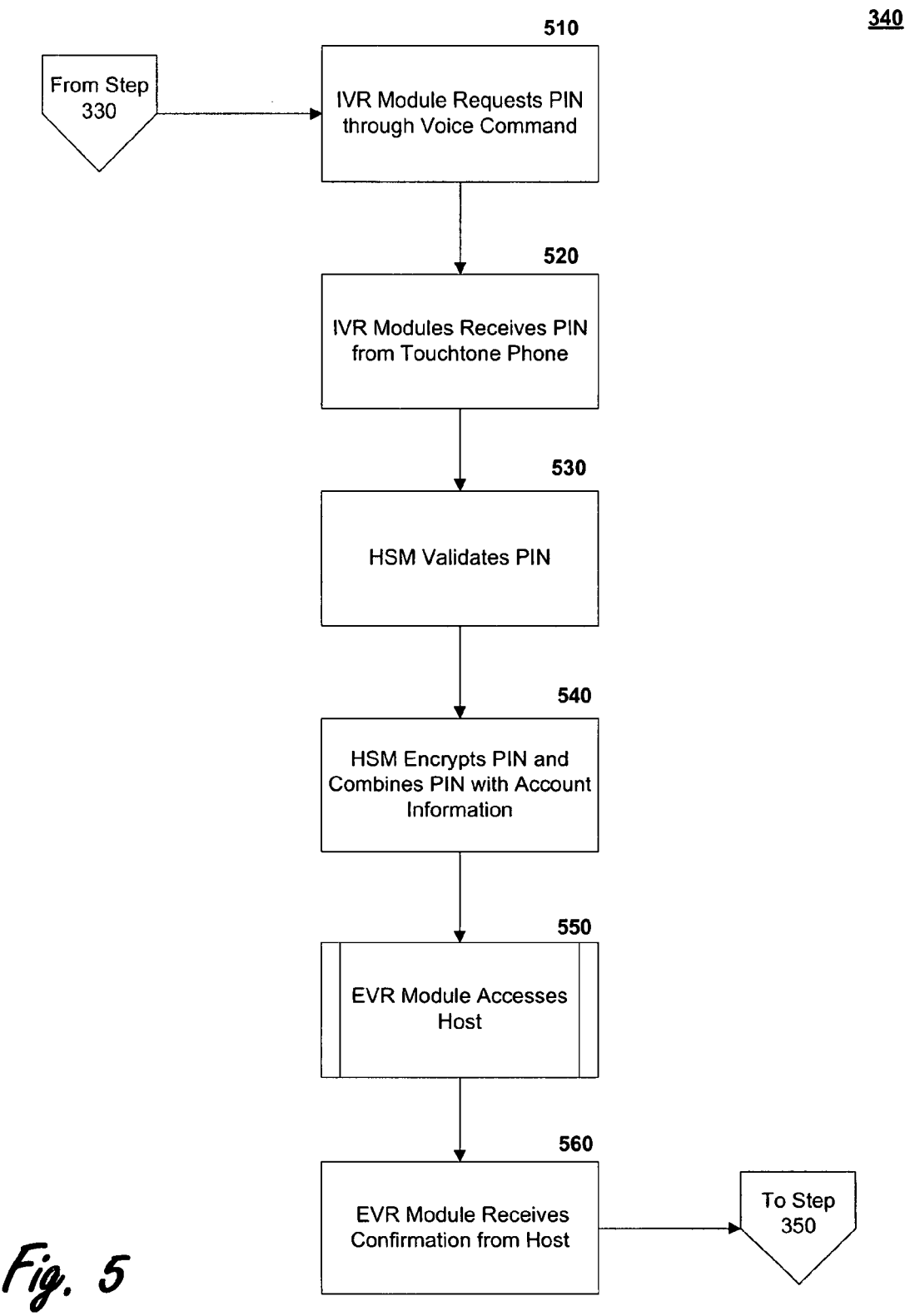
FIG. 5 depicts a process flow diagram for encrypting customer information gathered with an EVR unit in accordance with an exemplary embodiment of the present invention.

FIG. 5 depicts a process flow diagram 340 for encrypting customer information gathered with an EVR unit in accordance with an exemplary embodiment of the present invention. Referring to FIGS. 1, 2, and 5, at step 510, the IVR module 220 component of the EVR module 210 requests the PIN or other sensitive information, from the customer. This request would be by a voice command, such as, "Using your telephone keypad, please enter a 4-digit PIN." At step 520, the IVR module receives the PIN or other information by decoding the tones that represent depressed keys on a telephone keypad. One of ordinary skill would understand that standard telephone and cellular phones emit tones when a key is depressed and that these tones are uniform and can be detected and translated into the numbers that were depressed.

At step 530, the hardware security module 230 validates the PIN. That is, the hardware security module 230 determines if the PIN is a weak PIN or a strong PIN. This validation may be by comparing the PIN to a list of PINs that are identified as "weak PINs." For example, the PIN "1-1-1-1" or "2-0-0-7" (the current year) may be classified as "weak." A customer may be prompted to provide a new PIN. This validation step necessarily takes place before the PIN is encrypted. By having the hardware security module 230 perform this validation, the PIN is stored at a secure location, rather than on a server that could be vulnerable to security breaches.

At step 540, the hardware security module 230 of the EVR module 210 encrypts the PIN, that is, the encryption takes place on a secure platform. The encrypted PIN would also be combined with account information for transmission to the host 130. At step 550, the EVR module 210 accesses the host 130. This step is discussed in greater detail below, in connection with FIG. 6. At step 560, the EVR module 210 receives confirmation from the host 130 that the PIN or other sensitive information has been associated with the account.

Figure 6:
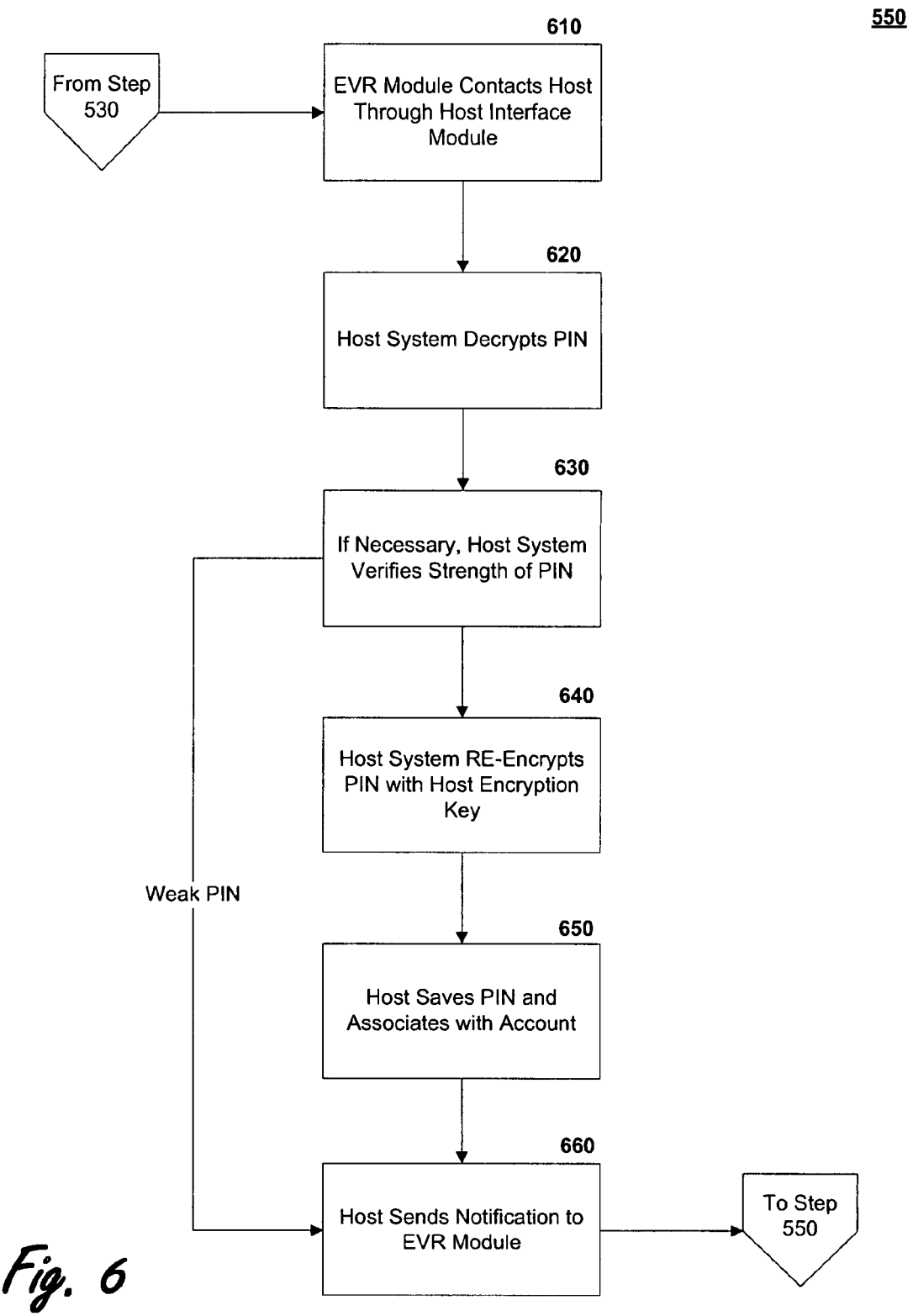
FIG. 6 depicts a process flow diagram for secure transmission of customer information between an EVR and a host system in accordance with an exemplary embodiment of the present invention.

FIG. 6 depicts a process flow diagram 550 for secure transmission of customer information gathered with an IVR application between an EVR and a host system in accordance with an exemplary embodiment of the present invention. Referring to FIGS. 1, 2, 5, and 6, at step 610, the EVR module 210 contacts the host 130 through the host interface module 260. At step 620, the host 130 decrypts the PIN. This step may be accomplished by applying the same secret key used to encrypt the PIN at the hardware security module 230 or may be accomplished by applying a private key associated with a public key.

At step 630, the host 130 may perform a validation of the strength of the PIN. This step may be in addition to step 530 or instead of step 530. Or, preferably, step 630 could be omitted. Whenever the PIN resident at the host 130 in an unencrypted form (such as during validation), the PIN may be vulnerable to a security breach. Typically, the host 130 would host numerous processes, making the system more vulnerable than the hardware security module 230. As such, the validation step is preferably done, if at all, at the hardware security module 230 and not at the host 130.

At step 640, the host 130 re-encrypts the PIN using a different encryption key, that is, a key used by the host 130 for encrypting such information. At step 650, the host 130 saves the encrypted information with the account information. At step 660, the host 130 sends a notification to the EVR module 210, confirming the process. In some cases, the host 130 may reject the PIN as a weak PIN and this notification would be sent to the EVR module 210.

One of ordinary skill in the art would appreciate that the present invention supports systems and methods for encrypting sensitive information sent using an IVR system. The systems and methods may include an HSM that provides a secure platform to encrypt the sensitive information. They may also include interfaces with IVR systems and transaction processing hosts. The systems and methods may interact directly with a customer using an IVR to receive the sensitive information. They may also provide for a secure platform to validate the strength of the information, such as a PIN or password, prior to further processing of the sensitive information.

What is claimed:

1. A system for encrypting information from an interactive voice response application comprising:
    an interactive voice response module comprising computer-implemented instructions resident on a computer, operable to receive a data item, wherein the data item comprises a personal identification number (PIN), from a telephone comprising one or more selected numbers from a keypad associated with the telephone;
    a hardware security module comprising computer-implemented instructions resident on the computer, logically connected to the interactive voice response module, and operable to encrypt the data item received from the telephone; and
    a host platform, logically connected to the hardware security module and operable to receive the encrypted data item.

2. The system of claim 1 wherein the hardware security module is further operable to determine if the PIN is a weak PIN.

3. The system of claim 1 wherein the host platform comprises a platform for authorizing financial transactions.

4. The system of claim 1 wherein the data item further comprises information about a financial account.

5. The system of claim 4 wherein the financial account comprises a pre-paid credit card account.

6. The system of claim 1 further comprising an encryption voice response module that includes the interactive voice response module and the hardware security module and wherein the encryption voice response module resides on an encrypted voice response unit.

7. The system of claim 1 wherein the telephone comprises a cellular telephone.

8. A system for encrypting information from an interactive voice response application comprising:
    an encryption voice response unit further comprising:
        an interactive voice response module comprising computer-implemented instructions resident on a computer within the encryption voice response unit, operable to receive a data item, wherein the data item comprises a personal identification number (PIN), from a telephone comprising one or more selected numbers from a keypad associated with the telephone; and
        a hardware security module comprising computer-implemented instructions resident on the computer within the encryption voice response unit, logically connected to the interactive voice response module, and operable to encrypt the data item received from the telephone; and
    a host platform, logically connected to the encryption voice response unit and operable to receive the encrypted data item and comprising a platform for authorizing financial transactions.

9. The system of claim 8 wherein the encryption voice response unit is further operable to determine if the PIN is a weak PIN.

10. The system of claim 8 wherein the encryption voice response unit is configured to be located remotely from the host platform.

11. The system of claim 8 wherein the data item further comprises information about a financial account.

12. The system of claim 11 wherein the financial account comprises a pre-paid credit card account.

13. The system of claim 8 wherein the encrypted voice response unit is a kiosk.

14. The system of claim 8 wherein the telephone comprises a cellular telephone.

* * * * *